Sept. 14, 1937.         J. S. LUNDVALL         2,092,981
REFRIGERATOR CAR BULKHEAD
Filed Dec. 10, 1936         3 Sheets-Sheet 1
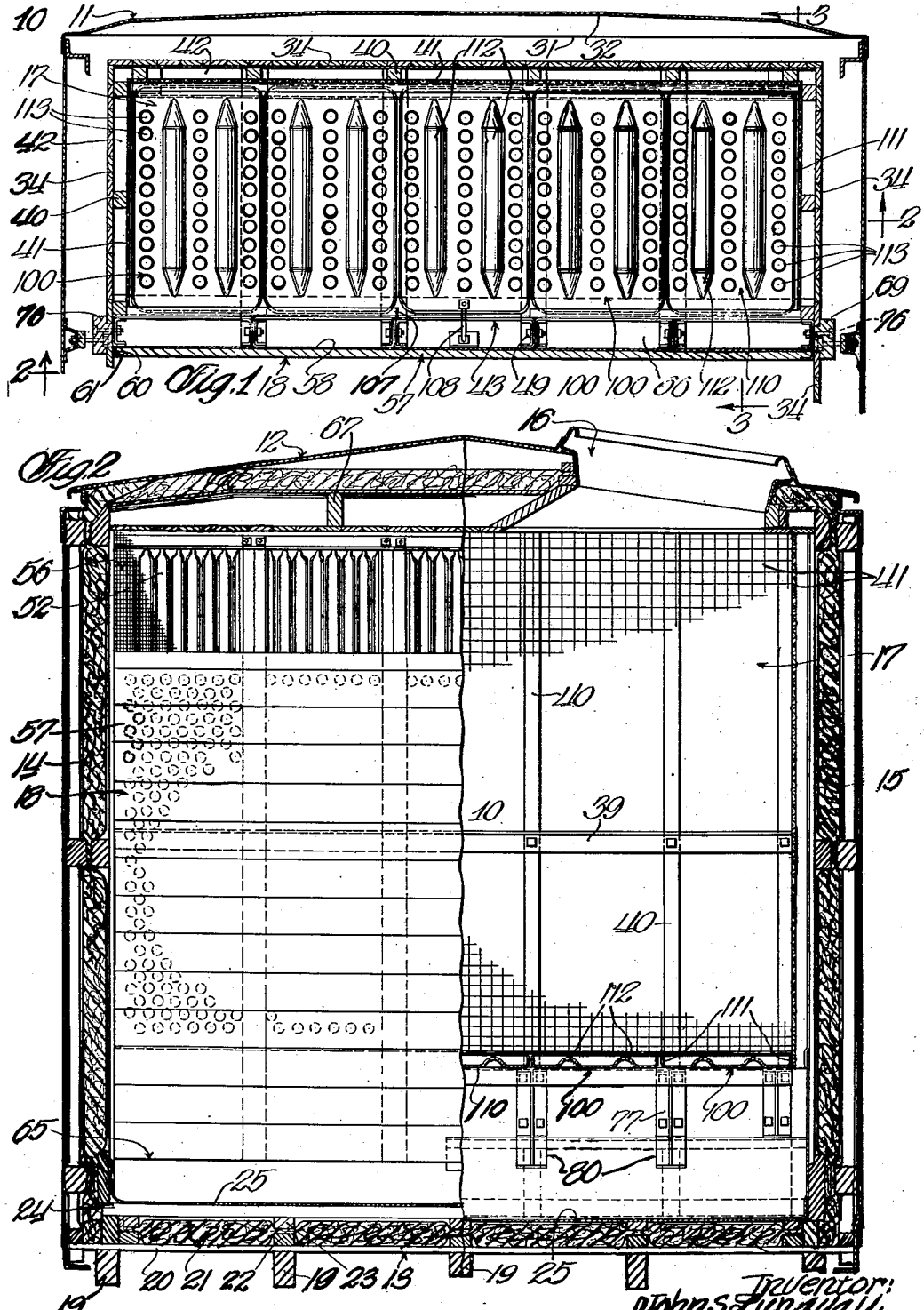

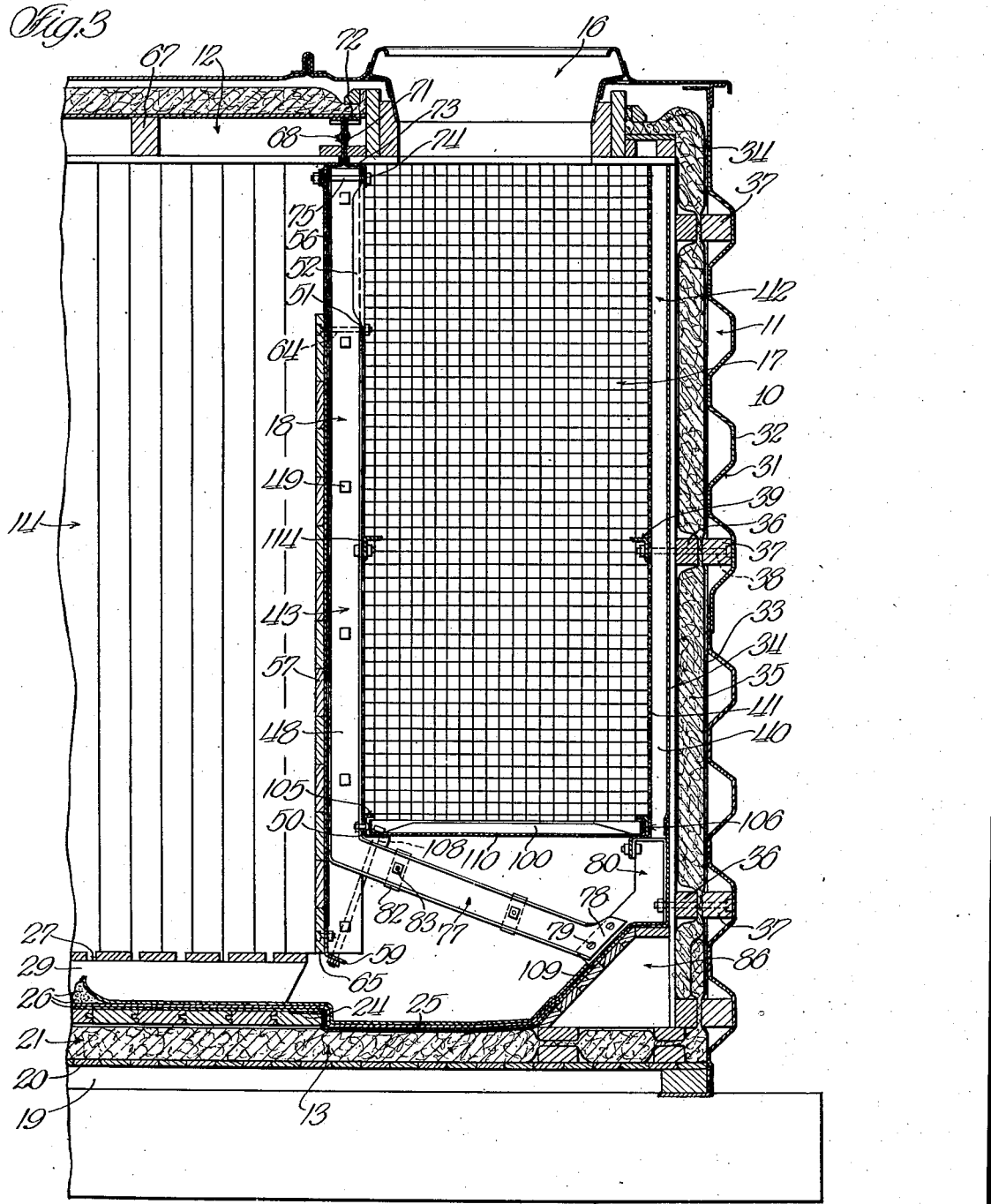

Sept. 14, 1937.   J. S. LUNDVALL   2,092,981
REFRIGERATOR CAR BULKHEAD
Filed Dec. 10, 1936   3 Sheets-Sheet 3
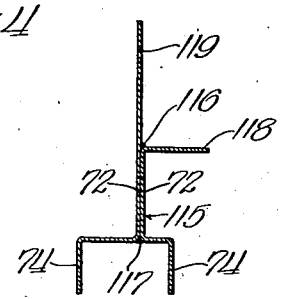
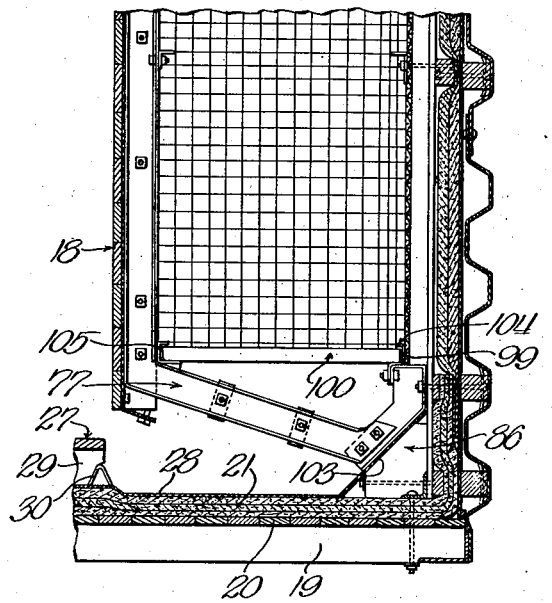
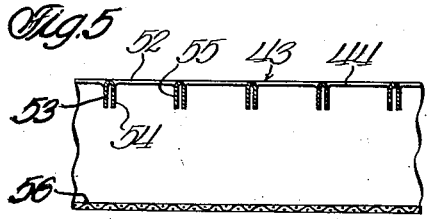
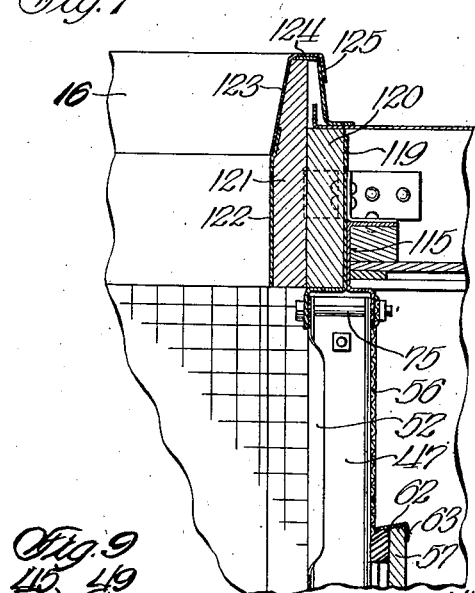
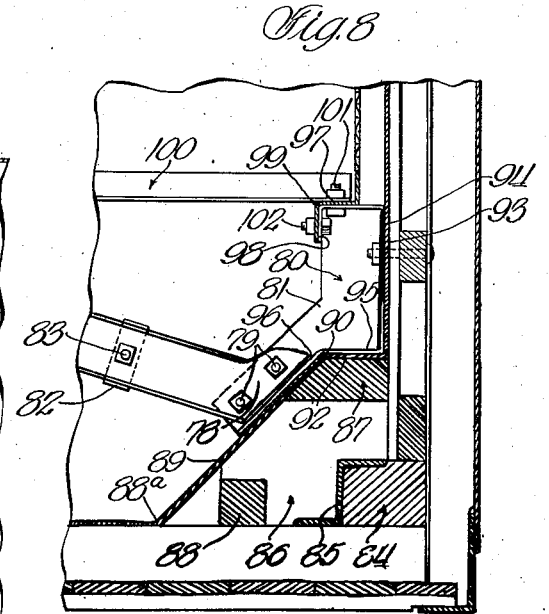
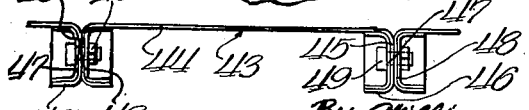
Inventor:
John S. Lundvall
By Williams, Bradbury, McCaleb and Hinkle
Attys.

Patented Sept. 14, 1937

2,092,981

UNITED STATES PATENT OFFICE 2,092,981

REFRIGERATOR CAR BULKHEAD

John S. Lundvall, Chicago, Ill., assignor to Union Asbestos & Rubber Company, Chicago, Ill., a corporation of Illinois Application December 10, 1936, Serial No. 115,107

11 Claims. (Cl. 105—376)

The present invention relates to refrigerator cars, and is particularly concerned with an improved bulkhead construction, by means of which the bulkhead load may be distributed over the sill area of the car, although the bulkhead may be entirely disconnected from the floor of the car immediately below the bulkhead.

In the bulkhead constructions of the prior art the bulkhead is adapted to receive the thrust caused by shifting of loads on the floor racks. These shifting loads eventually loosen the lower floor bolts which fasten the bulkhead to the floor in those devices, thereby causing leakage, and the water leaking through around the loosened bolts wets the insulation, causing it to rot, and greatly reducing its efficiency.

One of the objects of the invention is the provision of an improved bulkhead structure in which the floor bolts underneath the bulkhead have been entirely eliminated, thereby preventing any leakage at this point, and assuring the maintenance of the insulation in good, dry condition.

Another object of the invention is the provision of an improved bulkhead construction in which floor bolts are eliminated, but which is adapted to transmit the bulkhead load to the end sill of the car, thereby providing a bulkhead which is adapted to withstand any load which might be placed upon it by the shifting of merchandise on the car floor.

Another object of the invention is the provision of an improved ice chamber structure, including new pan grates or grate sections which are so constructed that the slush and fine ice does not fall through them, and therefore does not clog the trap.

Another object of the invention is the provision of improved bulkhead and grate pan structures adapted to be arranged for half icing and which are also pilfer-proof because the grate pans cannot be removed from the ice chamber side, as might be the case when the hatch cover is removed.

Another object of the invention is the provision of an improved bulkhead structure which provides a greater percentage of air opening, in order to secure a better circulation of the air, particularly when bananas are shipped in the car.

Other objects and advantages of the invention will be apparent from the following description and the accompanying drawings, in which similar characters indicate similar parts throughout the several views.

Referring to the three sheets of drawings,

Fig. 1 is a fragmentary, horizontal sectional view, taken through one end of the refrigerator car constructed according to the present invention, the section being taken at a point above the grate pans in the ice chamber;

Fig. 2 is a vertical sectional view through a refrigerator car constructed according to the present invention, taken on the plane of the line 2—2 of Fig. 1, looking in the direction of the arrows, showing the bulkhead in elevation and showing the inside of the ice chamber, with the grate pans in section;

Fig. 3 is a fragmentary vertical sectional view, taken on the plane of the line 3—3 of Fig. 1, looking in the direction of the arrows, showing the construction of the bulkhead and end of the refrigerator car of the type employing a canvas covering over the flooring;

Fig. 4 is a cross-sectional view through the top header for the bulkhead, by means of which the bulkhead is attached to the roof of the car;

Fig. 5 is a horizontal sectional view, taken through the ventilation openings in the upper part of the bulkhead, by means of which a much greater ventilation area may be secured;

Fig. 6 is a fragmentary view similar to Fig. 3, showing the construction of the car at an ice chamber and bulkhead when a steel car flooring is employed;

Fig. 7 is a fragmentary sectional view similar to the upper part of Fig. 3, showing the hatchway and upper bulkhead construction of a modification;

Fig. 8 is a fragmentary sectional view similiar to the lower right corner of Fig. 3, showing the details of construction of a modification;

Fig. 9 is a larger fragmentary view of a portion of the bulkhead construction.

Referring to Figs. 1 to 3, 10 indicates in its entirety the refrigerator car, which may be provided with end wall 11, top wall 12, bottom wall 13, and side walls 14 and 15.

The car is usually provided at each end with a hatchway 16, leading to an ice chamber 17, which is divided from the rest of the car by a bulkhead 18, located near each end of the car.

The floor construction or bottom wall may be substantially as described in my co-pending application, Refrigerator cars, Ser. No. 110,571, filed Nov. 13, 1936, and all of the disclosure of said application is hereby incorporated by reference thereto.

In brief, the main sills 19 of the car support a layer 20 of sub-flooring, upon which rests the insulation 21, which may comprise a plurality of layers or bats of insulating belt of vegetable, mineral, or animal fibers, preferably the former, laid with broken joints.

The insulation 21 may be clamped between sub-stringers 22, 23, which are located above the main stringers 19. The sub-stringers 23 support the flooring 24, which in the embodiment of Fig. 3 comprises a layer of tongue-and-groove lumber over the entire floor of the car, supplemented by a steel drip pan 25, which overlaps the flooring 24 and extends upward on three sides of the car wall 11, inside the ice chamber 17.

In the embodiment of Fig. 3, the car flooring 24 is water-proofed by the application of a plurality of layers 26 of canvas, impregnated with waterproofing material such as asphalt or tar or other initially plastic seaming compound, with which the impregnated layers of canvas are cemented to each other and to the floor with overlapping and broken joints. The floor racks 27 then rest upon the lower or floor wall 13 so constructed.

Referring to Fig. 6, this is a modified form of flooring, in which the main stringers 19 are also covered with sub-flooring 20 supporting the layers of insulation 21, which are clamped in place by sub-stringers, as described in my prior application. The entire floor area in this construction is covered with a layer of sheet steel 28, which may be constructed in one piece or in a plurality of sections, welded together or riveted together, or provided with joints, as described in my prior application.

In this case 27 marks the end of the floor racks, the longitudinal frame members 29 of which engage a sheet metal stop member 30 of substantially U shape, which is welded to the steel flooring 28, and which prevents the shifting of the floor racks under load. In this embodiment the steel flooring is continued underneath the ice chamber to form the drip pan, and it extends upward on the side walls of the car, not only in the ice chamber, but over the rest of the lower portion of the car walls, to such an extent that the water level may never rise above the edge of the vertical steel flooring flanges.

The side walls of the refrigerator car may be constructed as shown in my co-pending application, Ser. No. 103,735, Refrigerator car construction, filed October 2, 1936. For example, the end wall may comprise a sheet steel member 31, having a plurality of pressed reinforcing ribs 32 and covering the entire end area of the car. A second layer 33 of steel is located inside the member 31, and a layer of lumber 34 forms a wall chamber for receiving the insulation 35.

The insulation, similar to that described with respect to the floor, may be clamped between wooden clamping bars 36, 37, which are provided with bores for passing the clamping bolts 38. The bolts 38 may also be employed for securing the angle iron supports 39 in place, which are used for half icing. Inside the sheathing 34, the car walls, at the bulkhead, are provided with vertically extending frame members 40, which support the wire mesh screening 41 of a non-corrodible copper alloy. This provides the ventilation conduits 42 between the screening 41 and the sheathing 34 on three sides of the ice chamber.

The fourth side of the ice chamber is defined by the bulkhead 18 of improved construction. The framework of the bulkhead 18 preferably comprises a plurality of sheet metal sections 43, which are long enough to extend from the bottom of the bulkhead to the top of the car and wide enough so that a plurality of such sections, such as, for example, five sections in Fig. 1, placed edge to edge, cover the entire bulkhead area.

Each bulkhead section 43 comprises a relatively thin sheet metal member, having a flat body 44, an edge flange 45 at right angles to the body, and a parallel flange 46 at each edge of the body.

The parallel flanges 46 are turned inward toward each other. The body 44 is reinforced to some degree by the flanges 45 and 46, but the sections are preferably further reinforced and provided with frame members at regularly spaced intervals by the use of additional channels 47, 48. The channels 47, 48 fit into the spaces defined by the body 44, flange 45, and flange 46, and the channels 47, 48 and flanges 45 are secured together by screw bolts and nuts 49 located at regularly spaced intervals. Thus the bulkhead is provided with vertically extending frame members of suitable strength, comprising the channels 47, 48 and the adjacent flanges 45, 46.

It is not necessary to make the body wall 44 of the bulkhead sections of such heavy material as would be necessary if the flanges 45 and 46 alone were relied upon to provide sufficient stiffening at the vertical frame members of the bulkhead.

The body 44 of each section 43 is preferably an imperforate sheet from the point 50 in Fig. 3 to the point 51 adjacent the top, but at its upper end each body portion of the bulkhead sections is provided with vertically extending apertures 52. These apertures have been so arranged that although the bulkhead still prevents access to the interior of the refrigerator car, through the hatchway 16 and ice chamber 17, when the hatchway is unlocked, a maximum amount of ventilation area or opening at 52 is provided. With the present construction as much as eighty percent opening may be made in that portion of the bulkhead in which the openings are located.

Each opening 52 may be made as shown in Fig. 5. The body 44 of the bulkhead section is provided with a slit, and the edges of the sheet metal adjacent the slit are bent inward until the two flanges 53, 54 formed from opposite sides or adjacent slits, come into parallel relation as shown in Fig. 5.

All of the space represented between the flanges 54, 55 in Fig. 5 is the area of the opening. As the sheet metal of which the body 44 is constructed may be relatively thin, since the bulkhead is reinforced by channels 47, 48, the flanges 53, 54 need not be relied upon for complete protection against access into the refrigerator car chamber, and a wire netting 56 may also be employed.

The wire netting 56 covers that portion of the bulkhead opposite the openings 52 from one side of the car and from the top of the car down to the wooden sheathing 57.

The bulkhead may be further strengthened by the use of a sheet steel lining 58 of sufficient size to cover the complete area of the bulkhead from the bottom edge of the wire netting 56 to the point 59 at the bottom. This steel lining may be provided with a right angle flange 60 at each edge adjacent the wall and with an inwardly turned flange 61 parallel to the body 58 of the sheet.

At the top, as shown in Fig. 7, it may be provided with a laterally turned flange 62 and a downwardly extending flange 63, which overlaps the sheathing 57. The sheathing 57 may be secured to the bulkhead sections 43 by means of a plurality of screw bolts 64 passing through the sheathing and through the bulkhead.

The sheathing thus extends downward to the point 65 at the floor rack level 27 and separates the car into the main chambers and the ice chambers 17. The space between the longitudinal frame members 29 of the floor racks defines a ventilation conduit which leads under the bulkhead at the point 65 into the ice chamber. The spaces 66 between the walls of the bulkhead also serve to define air conduits similar in function to the air conduits 42 between the sheathing 34 and the netting 41 surrounding the ice chamber. Thus the ice chamber is surrounded by air spaces and the air may pass in at the bottom of the ice chamber upward around the outside of the confined ice, as well as through the ice, wherever possible.

The bulkhead 18 may be suspended from the roof 12 of the car by means of a suitable top header. The roof 12 of the car rests upon the side walls 14 and 15, being provided with suitable rafters 67 resting upon the studs, forming part of the side walls.

In a similar manner the header 68 of sheet steel, or suitably channelled metal sections, rests upon vertically extending studs 69 and 70 at each side of the car. That header may consist of two similar metal members, each of which is formed with a vertical body flange 71, an outwardly turned flange 72 at the top, an outwardly turned flange 73 at the bottom, and a downwardly extending flange 74.

When these two members are fastened together by riveting, bolting, or welding to form the header 68, they form a beam of sufficient strength to support the bulkhead 18 and the depending flanges 74 embrace the upper ends of the bulkhead sections 43. The flanges 74 are then fastened to the bulkhead sections, preferably at spaced points located so that the through bolts 75, which are provided with nuts, pass through one or the other of the channels 47, 48 and flanges 46. These bolts also serve to secure the screening 56 in place and have their nuts on the inside of the car to prevent removal of the bolts.

The bulkhead 18 is thus suspended from the flanges 74 of the header 68 by means of bolts 75. At the side walls of the car the bulkhead 18 is also secured to the vertically extending studs 69, 70 by means of a plurality of screw bolts 76. At these points the flanges 45 abut directly against the inner face of the studs 69, 70, which are rabbeted to provide space for receiving the sheathing 34, which is also continued inside the main refrigerator car chamber.

Bolts 76 are provided at a multiplicity of regularly spaced points from the bottom of the bulkhead to the top thereof, thereby firmly securing the bulkhead to the sides of the car to resist thrust.

The body 44 of the bulkhead sections 43 may terminate at the point 50, but the flanges 45 and 46 thereof may continue on downward to a level indicated by the numeral 65, thereby providing support for the sheathing 57 on the bulkhead down to that point.

The channelled members 47, 48 extend from the top of the bulkhead 18, where they are secured to the header 68, down to the point 50, where these channelled members are bent diagonally, extending laterally and downwardly toward the end sill of the car. The diagonal portion of these channelled members is indicated by the numeral 77 in Fig. 3. These channelled members may be flattened out at their ends 78 to provide outwardly projecting flanges, which may be secured by means of screw bolts 79 to a foot member 80, which has a vertically extending flange 81 for engaging the foot flanges 78.

Since the flanges 45 of the sections 43 are not continued between the channels 47 and 48 in the diagonal portion 77, suitable spacing members 82 are clamped between the channels 47, 48 at the diagonal portion 77 and secured in place by through screw bolts 83. This permits these diagonal portions to be clamped tightly together at a spacing similar to their spacing in the body of the bulkhead, where they are separated by the flanges 45.

The refrigerator cars are usually provided with an end sill 84, extending across the lower end corner of the car, and this sill may be suitably reinforced with Z bars 85. Suitable wooden blocks 86 are located at regularly spaced points in the corner, engaging the sill 84 and Z bar 85, and complementarily formed to permit such engagement. The blocks 86 are supplemented with elongated cross frame members 87, 88.

The blocks 86 are located one for each set of channels 47, 48, and therefore one of the blocks 86 is located beneath the foot flange 78 and foot member 80 of each of the diagonal portions 77.

The sheet metal flooring 28 may be bent diagonally upward at the point 88a, conforming to the surface 89 of the blocks 86. The flooring may also be bent in a horizontal direction at 90, again conforming to the upper surface 92 of the frame members 87, and thereafter the flooring extends upward as at 93 on the end wall of the car, as shown in Fig. 8.

The foot members 80 may comprise the vertically extending flanges which are secured to the transversely extending bearing flanges 94, 95, 96, which are shaped to engage the portions of flooring just described, and to provide a larger bearing area. The vertical attaching flange 81 may be welded or otherwise permanently secured to the flanges 94, 95, 96, to transmit thrust thereto. A horizontally extending flange 97, carried by the vertical flange 94, may also be provided for support of the grates.

This flange 97 may have a downwardly turned edge 98, and the grate supporting bars 99 may be secured to the flanges 97 and 98. The grate supporting bar shown in Fig. 8 is of substantially Z shaped section, and the grate pan 100 is secured by a through bolt 101, which also fastens the Z bar 99 to the flange 97. Supplemental bolts 102, passing through the depending flange of the Z bar 99 and the flange 98, assure the securement of the Z bar in place.

Referring now to Fig. 6, this is a simpler form of end block construction, in which the blocks 86 have merely a diagonally and upwardly extending flat surface 103. The arrangement of the flooring is the same as just described, except for the horizontal portion 92, which is omitted.

In this case the Z bar 99 is also provided with an overhanging flange 104, which extends over the grate pans 100 and thus retains them in place without the necessity for the bolts 101. The bar 99 in this case constitutes a guide for slidably retaining the grate pans. The bulkhead 18 also supports a guide member 105 at the same level as the guide member 106 in Fig. 3. The guide member 105 consists of a channel with a vertical flange and two horizontally extending flanges, the horizontal flanges embracing the grate pans 100.

At one point in the flooring of the ice chamber the upper horizontal flanges of the channel 105 terminate, as at 107 in Fig. 1, the ends of these flanges being spaced sufficiently to permit one grate pan to be moved upward out of the guide 105. This particular grate pan may be secured in place by a long bolt 108 which passes through a hole in the bottom of the grate pan and extends diagonally downward through the flange 59 of the bulkhead steel lining, where it is secured by a nut. Since the other grate pans cannot be removed until this one is taken out, the single bolt 108 makes the entire grate pan structure pilferproof.

Referring to Fig. 3, the lower end corner of the refrigerator car here is substantially the same as described, except that the blocks 86 are covered with tongue-and-groove flooring 109, located underneath the water-proofing layers 26.

It will thus be observed that in all of these embodiments any thrust which is placed upon the bulkhead 18 is transmitted by the diagonally extending channelled reinforcing members 77 to the end sill of the car.

The bulkhead has no securing bolts passing through the floor of the car which might be loosened by the thrust imposed upon the bulkhead by shifting loads, and therefore there is no danger of any leakage through the floor due to load on the bulkhead. The feet 80 of the bulkhead supporting members 77 likewise have no bolts located in the lower portion or floor of the drain pan, and therefore present no possibility of leakage.

The present bulkhead may be made of lighter material than the devices of the prior art, and yet, by virtue of its suitable reinforcement by channelled members, it may be made just as strong at a lower cost.

Referring now to Fig. 1, the grate pans 100 cover the bottom of the ice chamber, providing it with a perforated flooring through which liquid may drain. These grate pans may be of any suitable area, but are preferably of sufficient length to extend from one side of the ice chamber to the other; that is, from the bulkhead 18 to the wall 11. Their width may depend upon various factors of design, but in the present embodiment five such grate pans cover the complete area of the bottom of the ice chamber 17. The grate pans are identical in construction, and therefore only one need be described.

Each grate pan has a relatively flat body portion 110 which rests upon the guide members 105, 106. The flat body portion is bounded on all sides by an upwardly extending flange 111 forming a pan or container. The flange 111 is of sufficient width to fit between the parallel flanges of the guides 105, 106, and it also serves to reinforce the pan 110.

The pan 110 is also preferably provided with one or more upwardly extending pressed ribs 112 extending longitudinally of the pan at regularly spaced intervals. The flat portions between these ribs may be provided with a multiplicity of regularly spaced apertures 113, providing drainage. These pans tend to retain the small portions of ice in the pan, but permit drainage of the water through the apertures 113. The ribs 112 cause the small pieces of ice to move over toward the apertures 113 to facilitate drainage, and in any event, should the apertures become clogged with ice, the drainage is had over the edges of the flanges 111 between the pans.

The ice chamber is preferably provided with the angle iron supports 39 and 114 (Fig. 3) located half way between the point 51 and the point 50. These angle irons 39 and 114 are secured to the side wall of the car and to the bulkhead 18 respectively, at half height in order that the grate pans 100 may be so placed on the angle irons for the practice of half icing.

Referring to Figs. 4 and 7, these are views showing the application of a modified form of header 115, which performs the function of the header 68 and is also adapted to facilitate the construction of the hatchway 16. This header comprises the depending flanges 74, as described with respect to the header 68, which are secured to the bulkhead 18 by through bolts 75. The header 115 is provided with a pair of body flanges 72, secured together by welding at 116, 117 and other suitable spot welds, but the body flange 72 extends vertically upward on the left, while the body flange 72 on the right is bent at right angles, providing a horizontal flange 118 and a vertical portion 119.

The hatchway 16 shown in Fig. 7 is reversed with respect to that of Fig. 3, as though the bulkhead were at the other end of the car; but this hatchway may be formed by the wooden frame members 120, 121, which are covered on the inside with a layer of sheet steel 122, 123, which extends horizontally at 124 over the upper edge of the hatch wall and downward at 125.

The frame members 120, 121 may extend from one side to the other of the car, supplementing the header 115 in providing support for the bulkhead 18. Thus the header 115 constitutes a combination hatch carline and bulkhead header which may be constructed of open hearth steel and galvanized, whereas the member 68 is a bulkhead supporting header made in two pieces, separately galvanized and riveted together.

It will thus be observed that I have invented an improved bulkhead structure which is adapted to be suspended from the ceiling of a refrigerator car, thereby completely eliminating the necessity for bolts passing through the flooring of the car at the bulkhead.

The present bulkhead is provided with means for transmitting the load on the bulkhead directly to the end sill of the car without necessity for using any through bolts in the floor, and thus there is no possibility of such bolts getting loose and causing leakage through the floor into the insulation.

The insulation may be kept in prime condition for the full life of the car, and the present invention is not only adapted to be used with my improved steel flooring, but with floorings of the prior art. The grate pans prevent the small particles of ice from dropping through the gate to clog the water trap, yet suitable ventilation apertures are provided, which assure a constant and free flow of air around the ice and around the ice chamber.

The present bulkhead may be constructed of lighter material, which makes it more economical than the devices of the prior art, and by means of its improved construction, including the reinforcing channels, it may be made just as strong. The load on the bulkhead is transmitted directly to the end sill of the car, where thrust is transmitted to the couplers of the car.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a refrigerator car construction, a bulkhead comprising a plurality of sections of relatively light sheet metal, each section comprising an elongated sheet steel member having at each edge a transversely extending flange adapted to engage a similar flange on another section, said sections being secured together at said flanges to provide a complete bulkhead, and a plurality of reinforcing members of stock shape engaging said flanges and secured by the same securing devices for stiffening the bulkhead.

2. In a refrigerator car construction, a bulkhead comprising a plurality of sections of relatively light sheet metal, each section comprising an elongated sheet steel member having at each edge a transversely extending flange adapted to engage a similar flange on another section, said sections being secured together at said flanges to provide a complete bulkhead, and a plurality of reinforcing members of stock shape engaging said flanges and secured by the same securing devices for stiffening the bulkhead, said bulkhead being suspended from the roof of the refrigerator car and being characterized by the absence of securing devices below the bulkhead in the floor.

3. In a refrigerator car construction, a bulkhead comprising a plurality of sections of relatively light sheet metal, each section comprising an elongated sheet steel member having at each edge a transversely extending flange adapted to engage a similar flange on another section, said sections being secured together at said flanges to provide a complete bulkhead, and a plurality of reinforcing members of stock shape engaging said flanges and secured by the same securing devices for stiffening the bulkhead, said bulkhead having an auxiliary layer of sheet steel carried at the edges of said flanges for further strengthening the bulkhead and providing a vertically extending air conduit through the bulkhead.

4. In a refrigerator car construction, the combination of a bulkhead with means for securing said bulkhead to the ceiling of a refrigerator car, and means for transmitting thrust on the bulkhead directly toward the end sill of the refrigerator car, said bulkhead comprising a plurality of sheet metal sections provided with reinforcing members located adjacent the joints between the sections.

5. In a refrigerator car construction, the combination of a bulkhead with means for securing said bulkhead to the ceiling of a refrigerator car, and means for transmitting thrust on the bulkhead directly toward the end sill of the refrigerator car, said bulkhead comprising a plurality of sheet metal sections provided with reinforcing members located adjacent the joints between the sections, said reinforcing members having lower diagonally extending portions constituting means for transmitting thrust to the sill.

6. In a refrigerator car construction, a combined header and hatchway carline comprising a pair of sheet metal members having flat body flanges secured together, each of said sheet metal members having a laterally turned portion and terminating in a downwardly extending flange, said downwardly extending flanges being adapted to embrace and support a bulkhead.

7. In a bulkhead, the combination of means for supporting a plurality of sheet metal sections adjacent the end of a refrigerator car for forming a bulkhead, each of said sections having a flat body portion located between vertically extending reinforcing portions, said flat body portions being provided at the top with ventilation apertures comprising the spaces between substantially parallel, transversely bent flanges formed out of said body portion, and extending at substantially right angles to said body portion, thereby achieving a maximum ventilation area in a minimum of space.

8. In a refrigerator car bulkhead support, the combination of a blocking structure located in the lower end corner of a refrigerator car, with a sheet metal flooring covering said blocking structure, a metal foot member engaging said flooring above said blocking, and a bulkhead supporting arm secured to said foot and extending diagonally upward toward a bulkhead.

9. In a refrigerator car bulkhead support, the combination of a blocking structure located in the lower end corner of a refrigerator car, with a sheet metal flooring covering said blocking structure, a metal foot member engaging said flooring above said blocking, and a bulkhead supporting arm secured to said foot and extending diagonally upward toward a bulkhead, said footing and flooring being characterized by the absence of securing devices extending through the flooring to prevent possibility of leakage through the flooring.

10. In a refrigerator car bulkhead, the combination of a refrigerator car with means for connecting a bulkhead to the ceiling of the car, brackets secured to the end wall of the car for support of the bulkhead, channel shaped reinforcing members secured to the ceiling connection and extending downward to the grate line, and continuing at an angle laterally toward the end of the car, said channel shaped reinforcing members being secured to said brackets.

11. In a refrigerator car, a bulkhead, said bulkhead comprising a plurality of panels defining a bulkhead partition, channeled reinforcing members supporting said panels, and means for securing said channeled reinforcing members to the ceiling of said car and to the end wall of said car.

JOHN S. LUNDVALL.